Oct. 9, 1934.     T. L. M. MILLAR     1,976,183
ELECTRIC CIRCUIT BREAKER RECLOSING RELAY
Filed Feb. 5, 1931     2 Sheets-Sheet 1

Inventor:
Thomas Levice Minford Millar
By [signature]
Attorney.

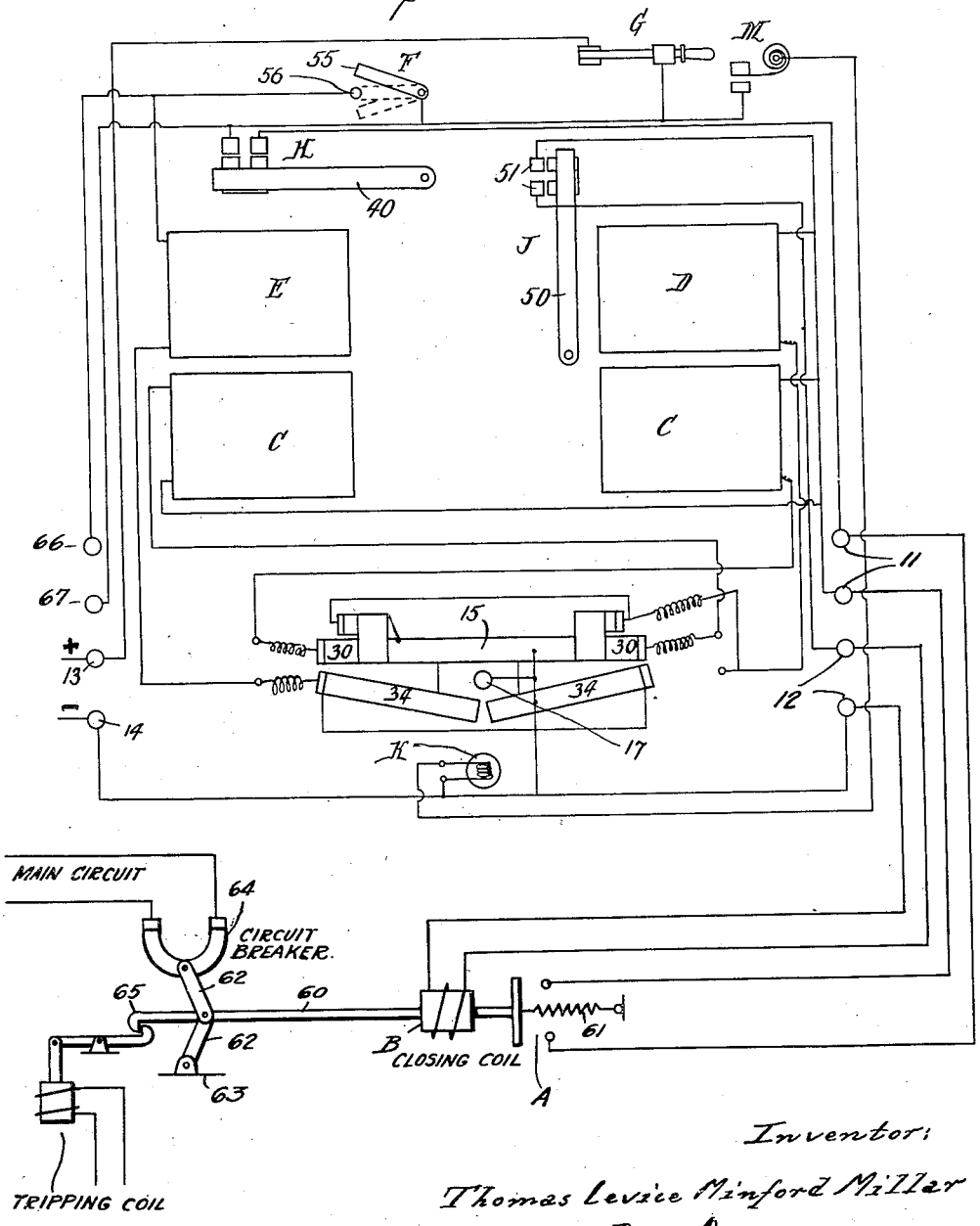

Patented Oct. 9, 1934

1,976,183

UNITED STATES PATENT OFFICE 1,976,183

ELECTRIC CIRCUIT BREAKER RECLOSING RELAY

Thomas Levice Minford Millar, Hamilton, New Zealand, assignor to The Millar Patent Electric Control Company, Limited, Hamilton, New Zealand, a company of New Zealand Application February 5, 1931, Serial No. 513,698
In New Zealand February 26, 1930

5 Claims. (Cl. 175—294)

The invention has reference to the well known means used in electric power lines, to break the line and cut off the power supply, on certain faults occurring. For this purpose the means hitherto employed in this connection comprise a breaker switch of stereotype nature that is arranged within the main service line and by its "on" and "off" positions to make and break the current supply. These switches are generally referred to as breakers and in the installation of each breaker it is in most instances combined with an electric motor arranged conveniently thereto which, when set in operation after the switch has opened, will mechanically restore the switch to the closed position. The actuation of the motor for this purpose is obtained by the completion through it of a relay circuit which by the action of the breaker is put in a condition to be closed by the manual operation of a switch at a control station or point. Attendance of an official for this purpose is therefore required and as in many instances the fault causing a break may be of a transient nature, unnecessary delay and inconvenience often result before a break is restored.

The object of the present invention is to provide means operable through the relay-motor circuit, whereby the breaker may be automatically re-closed should a break occur, and which means are so made and operate that, if the fault is maintained, the main circuit breaker after two re-closings, with the lapse of a predetermined interval of time between them, on again opening for the third time, will be prevented from again closing by opening the relay circuit controlling the re-closing motor.

Particularly the apparatus may be arranged to provide for two definite re-closings with a period of thirty seconds or more between them, and then if the breaker again opens, to lock it off the line.

This method ensures that if the breaking cause or fault is sustained, the break is made permanent after two attempts to close it, by locking out the breaker permanently, where it will remain until the fault has been cleared and the apparatus restored to normal. If on the other hand the fault is transient, the relay operates the re-closing motor once or twice, and the breaker stays in to restore the circuit to normal.

The invention embodies the combination with the breaker and with the re-closing motor used in these circumstances, of means adapted when the relay circuit is closed by the opening of the breaker, to be set in operation through the employment of a novel arrangement of time lag switches of the known type in which tipping tubes containing a more or less viscous liquid are employed and rolling metallic balls are placed therein to roll from one end to the other of the respective tubes and at the end, or ends, to close circuits connected with the operating means.

It also embodies means actuated by the tipping tubes whereby on a specific number of tips taking place, a mechanical switch controlling the relay circuit is opened and retained open, and then when the tubes have come to rest and the fault is removed, whereby this relay circuit switch is closed, to re-set the apparatus ready for operation on a further occasion arising.

In fully describing the invention reference will be made to the accompanying sheets of drawings, in which:—

Figure 3 is a diagram showing the arrangement of the circuits employed with the apparatus.

Figure 1:
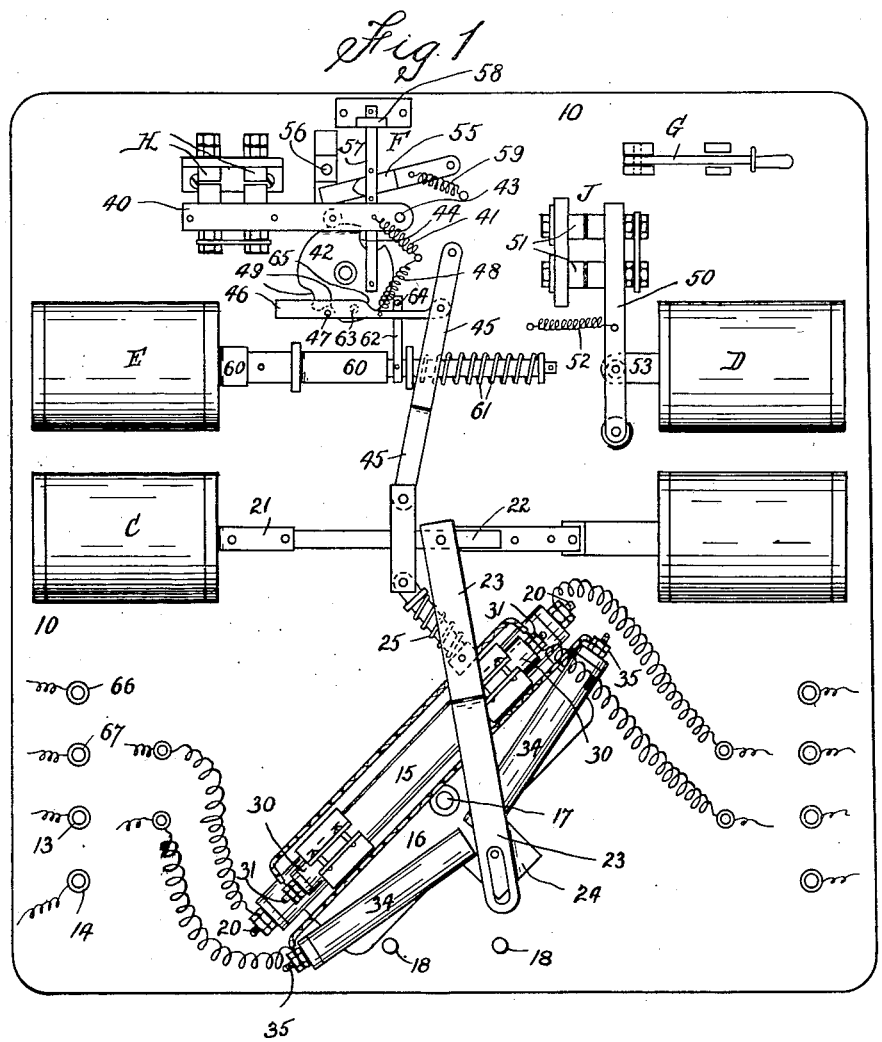
Figure 1 is a front elevation of the complete apparatus.
Figure 2:
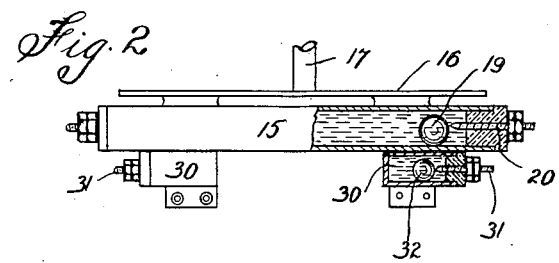
Figure 2 is a plan, one end being in section, of the time lag switch assembly.

The apparatus is designed to be used in conjunction with any of the known types of circuit breakers employed with power lines. Such circuit breakers are adapted on a fault occurring to cut out the main line and to close a contactor A to complete a relay circuit including a reclosing motor or reclosing coil B, which is thereby energized to actuate the circuit breaker to again close the main line.

A conventional circuit breaker of the type to which this invention is applied is shown diagrammatically in Fig. 3 of the drawings. As shown, a sliding rod 60 carries a movable element of the contactor A and is provided with a spring 61 which urges the rod toward a position to close contactor A. A pair of toggle arms 62 are pivoted to rod 60. One of the arms 62 has its free end attached to a fixed support 63 and the other arm carries a movable element of the switch 64 for making and breaking the main circuit. To retain rod 60 in a position to close the switch 64 against the action of spring 61, a notched member 65 is provided which is engaged by a rocking lever 66 actuated by a tripping coil 67. The core of the closing motor B slides in a closing coil adapted to be connected by contactor A to the relay circuit.

This apparatus comprises a vertically disposed base board 10 having terminals 11 for the connection of the contactor A thereto and terminals 12 for the connection of the motor or closing coil B. It also has terminals 13—14 for the connection of the relay line wires. From these terminals extend the connections under which, when the breaker is opened from the main line and closed into the relay circuit, current is caused to flow from the terminal 13 through a main control switch G, a switch H, the contactor A, switch J and the motor B back to terminal 14 so that with these switches in the closed condition, which is the normal condition, as will hereinafter be explained, the motor B will be set in operation to re-set the breaker in the well known manner.

These switches H and J are each of particular design and have special functions that will be hereinafter set out.

The system of time lag switches employed comprises a main metallic tube 15 that is mounted upon a carrying bracket 16 which fits against the face of the base 10 and is pivoted thereon at 17 so that the bracket and its tube may rock reciprocally in a vertical plane to incline in reverse angles from the centre line, its tipping movements in each direction being limited by the stops 18. This bracket and the tube are in electric connection with the terminal 14 of the relay circuit. The tube 15 is filled with a liquid, such as oil, and contains a metallic ball 19 capable of rolling therein at a rate permitted by the viscosity of the oil and making contact with the tube. Each end is provided with an insulated contact pin 20 projecting into it and these pins are in electrical connection respectively with two solenoid magnets C disposed upon the base board 10 on opposite sides of the pivot 17, each end being connected to the magnet on the reverse side of the said pivot. The other pole of each magnet C is connected through the contactor A (when it is conditioned to close the relay circuit), the switch H, and the main control switch G to the other main terminal 13. The cores 21 of these magnets C are connected together by a rigid connection 22, and a rocking arm 23 is pivoted at its upper end to such connection and at its lower end to an insulated crank extension 24 of the bracket 16. Thus the to and fro longitudinal movements of the cores 21 and connection 22 will impart a rocking movement to the bracket and its tube 15. This movement of the cores is designed to be brought about by the alternate energizing of the respective magnets C through the closing of a circuit therethrough as the tube tips to each side and the ball 19 rolls to that end to make contact with the pin 20 at such end. The periods between the tips are determined by the viscosity of the liquid in the tube.

The tipping of the bracket and its tube is made quick and positive in each direction by the employment of a spring controlled toggle lever 25 in a well known way.

This construction of electrically controlled tipping time lag apparatus is already known, particularly by my United States Patent No. 1,749,775, and requires no further explanation in this specification.

Upon each end of the tube 15 a short tube 30 is fastened, such tube being closed and having an insulated contact pin 31 in its outer end only.
Each tube contains a liquid and a contact ball 32 adapted to make contact between the pin and the tube when the tube is tipped downward at its end. These contact pins are electrically bridged and are connected to one pole of a solenoid magnet D, the other pole of which is connected to one of the terminals of the contactor A so that on the relay circuit being closed thereby and the ball 32 in contact with either pin, the magnet is energized, the current flowing in this relay circuit from the terminal 13 through the main switch G, the switch H, the contactor A, magnet D to the terminal 31 and tube assembly and bracket back to terminal 14.

Also carried on the bracket 16 on each side of its pivot 17 are two further tubes 34 which extend approximately horizontally on the bracket. Each of these is closed and filled with a liquid and contains a contact ball similarly to the other tubes. Each also has an insulated contact pin 35 in its outer end only and the pins of both tubes are electrically bridged and are then connected to one pole of a fourth solenoid magnet E secured upon the upper part of the base board. The other pole of this magnet is connected through a special mechanical switch apparatus F in Figure 3 (afterwards more fully referred to) which when in the closed position connects it to one of the relay circuit terminals 13 in order that the rolling of the ball to the outer end of one of the tubes 34 will by connecting the contact pin 35 with the tube assembly, complete a circuit through this solenoid magnet, the whole tube assembly being electrically connected with the other terminal 14 of the relay circuit.

By this arrangement, therefore, the tube assembly when tipped to one side, which is the normal inoperative position, will on the closing of the relay circuit cause the tipping solenoid C on the reverse side to be brought into action, will energize the solenoid D, and will (should the switch F be closed) also energize the solenoid E. From then, when the assembly tips, the solenoids D and E will be cut out until the tip is finished, when they will be again put into action after lapses of time depending on the rate at which the balls roll in the respective tubes 30 and 34. The tips being regulated by the time taken for the ball to roll in the tube 15, it follows that the periods elapsing between the energizing and de-energizing of the respective solenoids, and also over which these extend, may be regulated by the relative viscosity of the liquid in the tubes and the periods taken in the rolling of the balls from one end to the other. In this invention suitable periods are, for the main tube 15, thirty seconds, for the short tubes 30, one quarter second, and for the tubes 34, ninety seconds.

The relay circuit input from the terminal 13, after passing through an isolating switch G, passes through the switch H which is formed by a lever 40 that is pivoted upon the base board 10, and is normally closed against the action of a spring 41, by means of a roller on the lever resting upon the periphery of a cam disc 42 that is mounted to rotate on a pin fixed to the base. This cam disc is formed with a depression 44 in its periphery which when it is brought beneath the said roller will allow the lever to drop and thereby open the switch and break the relay circuit.

A crank lever 45 is disposed vertically upon the base board to depend alongside the said cam disc, its upper end being pivoted to the base board and its lower end articulated to the connection 22 of the solenoid cores 21, in order that the movements of these, with the tipping actions of the tube assembly, will also cause this crank lever to be moved reciprocally on its pivot. Attached to this crank lever, at a suitable distance from its pivot, is a pawl arm 46 which extends across beneath the cam disc edge and has an inwardly projecting pin 47 that is adapted to underlie the disc edge. This arm is tensioned upwardly by a spring 48, in order that its pin 47 is kept closely in contact with the underside of the disc edge. Such disc edge on its underside is made with two notches 49 therein into which the pin is adapted to drop.

In the normal position of the apparatus, the pawl pin 47 engages in the first of these notches 49 so that on the first movement of the tube assembly, and the outward movement of the crank lever 45, the disc is given a partial rotation, then on the reverse movement caused by the tip back, the pin slides back and engages the next notch, and then on a further outward movement, or third tipping of the tube assembly, a further rotation is imparted to the disc. These movements of the disc are designed to bring the upper depression 44 beneath the roller on the switch lever 40 and to open the switch in the manner described. Thus provision is made for the relay circuit being broken on the third tipping action of the tube assembly.

The switch J controls the circuit through the motor B and the contactor A, and in its normal closed position allows for such being closed. In its open position it cuts out the motor to stop its action and such opening is designed to be effected by the energizing of the solenoid D immediately upon the completion of the tipping movement of the tube assembly in each direction. This switch embodies a lever arm 50 that is pivoted to the base board so that it extends up in front of such solenoid D. Its upper end bridges contacts 51 arranged in the motor circuit and is kept in contact therewith by a pull spring 52 drawing the lever normally out from the solenoid end. The arm is, however, attached to the core 53 of the solenoid, which core is normally drawn out by the action of the spring 52, and thus on the energizing of the solenoid, the lever is drawn in to cut out the motor from the relay circuit.

Consequently on the initial closing of the relay circuit through the breaker A, the motor B is cut out, by reason of the circuit then being also closed through the solenoid D, until the tipping of the tube assembly commences, when the solenoid is cut out by the breaking of contact in the tube 30 concerned and the motor circuit is closed by the release of the switch lever 50 from the solenoid action. The motor will therefore act during this period to re-close the breaker. The tipping of the tube assembly will restore the conditions respecting the solenoid so that should the breaker again open to reclose the relay circuit, the action of the motor circuit will be repeated to close the breaker again, and so on repeatedly if the relay circuit is maintained. However as the relay circuit switch H will be opened on the third tip of the tube assembly, two re-closings of the breaker will take place and then if it opens again to cause the third tip, the relay circuit is broken and the breaker thereby locked out.

The apparatus contains provision for the re-setting of the whole on the contactor A being re-closed, such provision causing the automatic re-setting to take place should the breaker remain in after being re-closed either once or twice on the operation of the motor B, and after the lapse of a period governed by the freedom of the balls to move in the tubes 34, and also for its manual re-setting.

The means for this purpose are concerned with the solenoid E and are brought into operation through the closing of the relay circuit through such solenoid, independently of the contactor A. They work in conjunction with the pawl arm 46 and with the switch F, and comprise the formation of such switch as a lever arm 55 pivoted to the base board 10, near its upper portion, which is connected with the input terminal 13 of the relay circuit through the isolating switch G, and a contact pin 56 arranged upon the base board that is connected to the second pole of the solenoid E, its first pole being connected through the tubes 34 with the other terminal 14 of the relay circuit terminals in the manner mentioned. This lever arm is connected to a push rod 57 attached to the face of the cam disc 42 and extending vertically upward through a suitable guide 58 on the base board and by which the first movement imparted to the cam disc by the pawl arm 46 is designed to move the switch from a normal lower position obtained by the tension spring 59, to make contact with the pin 56, and by its second movement to carry it up beyond such pin. Thus after the first or second tip of the tube assembly the switch F is closed ready to complete the circuit through the solenoid on the rolling of the ball downward into the end of the tube 34. Owing to the time lag provided for, this cannot occur before the next tip can take place, if the contactor A remains open, so that no energizing of the solenoid E can take place in these circumstances. Should the main circuit breaker remain closed after its first or second re-closing, however, the switch F will be closed and thus the solenoid may be energized by the completion of the relay circuit through it. If a third tip occurs, the switch F is again open and remains open.

The core 60 of the said solenoid E is normally drawn outward by a spring 61 and to this core an upwardly extending striker arm 62 is fixed. This is designed at its upper end to pass between the pawl arm 46 and the face of the cam disc 42 and to move in such space as the core moves in and out. A pin 63 is fixed to project out from the face of the disc, and a pin 64 is fixed to the striker arm 62 to project out over the top edge of the pawl arm 46 and more particularly over a cam edge 65 formed thereon. These parts are so disposed relatively that on the inward travel of the solenoid core the striker arm pin 64 will act on the pawl arm to depress it, to cause its pin 47 to clear the cam disc edge and the striker arm will then engage the pin 63 on the disc (which has been moved forwardly in the rotation of the disc provided for through the operations of the pawl arm) and will turn the disc back to its normal position, thereby re-closing the switch H ready for the apparatus to act again when required.

In the event of the main circuit breaker opening again after its second re-closing these automatic re-setting means will not act, but manual means controlled by a push button or like switch connected to the terminals 66—67 may then be actuated to send the relay current directly through the solenoid E and thereby to actuate the re-setting means. The push button is designed to connect the terminal 66 with the main terminal 13 so that when closed the relay current is sent directly through the solenoid from the input terminal 13 and returns through the tube assembly to the terminal 14.

In operation, the main circuit breaker due to an overload or break in the main line moves to a position to break the circuit through the main line and to complete a circuit across the terminals 11 by means of the contactor A. With the contactor A in this position current will pass from a source (not shown) through terminal 13, switch G, switch H, terminals 11 (connected by contactor A), switch J, one of the terminals 12, motor B, the other terminal 12 and terminal 14 back to the source. If the current is allowed to flow through motor B, it will move the contactor A back to its normal position to break the connection across terminals 11 and operate the main circuit breaker to complete the circuit through the main line.

In order to prevent motor B being immediately energized on the completion of the relay circuit by the contactor A, a switch J is actuated to break the circuit through motor B. Switch J is actuated by a magnet D.

The current through the circuit including magnet D flows from terminal 13 through switches G and H to the upper terminal 11 through contactor A to the lower terminal 11, through magnet D to contact pin 31, ball 32, to and through bracket 16 to terminal 14.

While the circuit including motor B is partially completed by the contactor A connecting terminals 11 together, a solenoid circuit is completed in parallel with the motor circuit and the circuit through magnet D.

This solenoid circuit includes the solenoids C and the switch assembly on the bracket 16. Now, if the switch assembly carried by bracket 16 is in the position shown in Fig. 1 of the drawings, current will flow from the lower of the two terminals 11 through the solenoid C shown on the right side of Figs. 1 and 3 to the insulated terminal 20 on the left end of tube 15 and thence through ball 19 and tube 15 to terminal 14. Upon energizing the solenoid C, the member 22 connecting cores 21 will be shifted to the right of the figures of the drawings and the bracket 16 and the structure carried thereby will be tilted about pivot 17 breaking the circuit through tube 15 for a time until the ball 19 rolls through the viscous liquid in the tube 15 to the other end thereof. When the ball reaches the right end of tube 15, a circuit will be established through the solenoid C on the left-hand side of the drawings.

Upon shifting of bracket 16, the circuit through magnet D is broken and the arm 50 of switch J is moved by spring 52 to close switch J thereby completing the circuit through motor B to cause the main circuit breaker to close the main line. Motor B is energized for a time interval measured by the time between the moving of ball 32 away from pin 31 on the left side of the drawings and the passage of ball 32 on the right side of the drawings through the viscous liquid to contact with the right hand pin 31. Upon contact of the ball 32 with right-hand pin 31, magnet D will again be energized to open switch J and stop motor B.

With this structure the motor B would be periodically energized as long as the fault existed in the main line. Now, in order to cease energizing motor B after energizing the same a given number of times, I provide the switches F and H and the associated structure.

When the structure shown in Fig. 1 tips to the right, lever 45 is shifted to the right and link 46 carried thereby engages a notch in disc 42 and causes the disc to be rotated counter-clockwise through a small angle. By reason of the connection between disc 42 and push rod 57, arm 55 is moved up to engage contact point 56. The latter movement partially completes a circuit through solenoid E. Due to the viscosity of the liquid in tube 34, a given time elapses before the circuit is completed through tube 34.

If, during and after this time, the main circuit breaker remains closed, then magnet E will be energized and the disc and switch F will be returned to the position shown in Fig. 1.

If the main circuit breaker does not stay closed, the tube assembly will tip back to the left before the circuit is completed in the right-hand tube 34 through magnet E. Pin 47 will then engage the second notch in disc 42 and if the main circuit breaker does not remain closed, the tube assembly will be shifted back to the right rotating disc 42 to a position whereby the roller on arm 40 will fall in the notch 44 to break the relay circuit to the breaker closing mechanism. Also switch F will be moved to its upper open position. Thus, there have been three periods in which motor B has been operated to close the main circuit breaker before the relay circuit is broken. To re-set the mechanism, electric energy is applied to terminals 66 and 67 to energize magnet E.

Of course, if after the disc 42 had been turned one notch and the tube assembly had shifted back to the position shown in Fig. 1, the main circuit breaker had remained closed, then there would be no further shifting of the tube assembly and after the period of time required for the circuit to be completed through tube 34 the magnet E would be energized. The structure actuated by magnet E would then be returned to its normal position.

If desired, means may be provided for warming the tube assembly in cold weather in order to prevent any thickening of the oil in the tubes that would interfere with the time lag operation of these switches. Means for this purpose are shown in the diagram Figure 3 and comprise the interposition within the relay circuit, of an electric lamp K positioned adjacent to the tubes, and a thermostatic switch M adapted when the temperature falls to a predetermined degree to close the circuit through the lamp so that its heat may act upon the tubes and warm them.

The apparatus may also have combined with it any approved counter indicator mechanism to record the number of re-closings made by the tube assembly between inspection periods.

The apparatus is mounted and its parts insulated in accordance with the requirements governing the operation and control of the various electric circuits.

I claim:—

1. An automatic circuit breaker closing device comprising a circuit breaker closing motor, a circuit breaker actuated switch in series with the closing motor, said switch adapted to be closed when the breaker is in a position to open a main circuit and adapted to be open when the breaker is in a position to close the main circuit, a pair of terminals adapted to be connected to a source of power, one of the terminals being connected directly to the motor, the other terminal being connected to the motor through said circuit breaker actuated switch and an electromagnetically operated switch, an electromagnetically operated rocking member, a plurality of liquid filled tubes mounted on the rocking member, insulated contact elements mounted at the ends of the tubes, metallic balls in said tubes adapted to provide an electrical connection between the tubes and said contact elements, conductors for connecting in series to said terminals one of the tube and ball switches and the electromagnet of the switch in series with the motor, and means operable upon rocking of the rockable member a predetermined number of times for breaking the connections between said circuit breaker operated switch and one of said terminals.

2. An automatic circuit breaker closing device comprising a circuit breaker closing motor, an independent electrical circuit connecting said motor with a source of power, said independent circuit including a switch actuated by the circuit breaker and adapted to be closed when the breaker is open and open when the breaker is closed, said independent circuit also including an electromagnetically operated switch, a rockable frame, a plurality of liquid filled tubes mounted on the frame, insulated contact elements at the ends of said tubes, and conductive balls in said tubes adapted to provide an electrical connection between the tubes and the contact elements, a magnet connected in a circuit including one of said tubes and ball switches for actuating said electromagnetically operated switch and adapted to maintain said switch open while the frame is in position for closing the tube and ball switches, and means operable upon a predetermined number of movements of said frame for opening the independent circuit.

3. An automatic closing device for a circuit breaker comprising a motor for closing the breaker, a switch operated by the breaker adapted to be closed when the breaker is open and open when the breaker is closed, an independent current supply line, a circuit connected to said supply line including the motor, the breaker-operated switch, a spring-closed switch and a cam-closed switch for energizing the motor when said switches are closed, a rockable frame, a plurality of sets of liquid filled tubes mounted on said frame, insulated contact elements in the ends of said tubes, conductive balls in said tubes for providing a connection between said tubes and contact elements, said tubes and balls constituting time lag switches, a second circuit shunted across the motor and spring-closed switch, and including a magnet for opening said spring-closed switch and a set of said time lag switches, a third circuit shunted across said motor and spring-closed switch and including a set of said time lag switches and a pair of opposed solenoids for rocking said frame, and means actuated by the frame for opening the cam-controlled switch to break all circuits connected to said independent supply line.

4. An automatic closing device for a circuit breaker comprising a motor for closing the breaker, a switch operated by the breaker adapted to be closed when the breaker is open and open when the breaker is closed, an independent current supply line, a circuit connected to said supply line including the motor, the breaker-operated switch, a spring-closed switch and a cam-closed switch for energizing the motor when said switches are closed, a rockable frame, a plurality of sets of liquid filled tubes mounted on said frame, insulated contact elements in the ends of said tubes, conductive balls in said tubes for providing a connection between said tubes and contact elements, said tubes and balls constituting time lag switches, a second circuit shunted across the motor and spring-closed switch, and including a magnet for opening said spring-closed switch and a set of said time lag switches, a third circuit shunted across said motor and spring-closed switch and including a set of said time lag switches and a pair of opposed solenoids for rocking said frame, means actuated by the frame for opening the cam-controlled switch to break all circuits connected to said independent supply line, and magnetic means connected in series with still another set of said tube and ball switches and a frame-operated switch directly to the current supply line for resetting the cam-controlled switch.

5. A device for closing a circuit breaker comprising a motor for closing the breaker, a breaker-controlled switch open when the breaker is closed and closed when the breaker is open, a rockable frame, means for rocking the frame from one position to another operable upon closing the breaker-controlled switch to complete a circuit including the means to a separate current supply line, means including time lag switches formed of liquid filled tubes containing conductive balls adapted to complete a circuit at one end of the tube and operable upon shifting of the frame for completing a circuit from the separate current supply line to the motor during a predetermined interval of time, and means operable upon the third shift of the frame for breaking the circuit including the closing motor and means for rocking the frame.

THOMAS LEVICE MINFORD MILLAR.